Dec. 17, 1929.   J. P. CROWLEY   1,740,006

APPARATUS FOR SURFACING SHEET GLASS

Filed May 5, 1924

INVENTOR
Joseph P. Crowley
BY C. A. Rowley
ATTORNEY

Patented Dec. 17, 1929

1,740,006

UNITED STATES PATENT OFFICE

JOSEPH P. CROWLEY, OF TOLEDO, OHIO, ASSIGNOR TO LIBBEY-OWENS GLASS COMPANY, OF TOLEDO, OHIO, A CORPORATION OF OHIO

APPARATUS FOR SURFACING SHEET GLASS

Application filed May 5, 1924. Serial No. 710,993.

This invention relates to improvements in the art of making polished plate glass, and more particularly to a new and improved method and apparatus for surfacing sheets of glass.

Its principal object is to provide a simple and economical method and apparatus for simultaneously surfacing a plurality of similar sheets of glass.

According to this invention several sheets, usually of similar configuration, are laid loosely side by side with their adjacent edges in contact upon the flat upper surface of a supporting table. A series of clamping members are movably secured to the upper surface of the table, these clamping members outlining between their inner edges a shallow recess on the table top, which recess corresponds to and is slightly larger than the area of the assembled group of glass plates. Means are provided for adjusting the clamping members into holding contact with the outer exposed edges of the group of plates so as to prevent relative movement of these plates amongst themselves, or movement of the group of plates on the table top. The surfacing tool is now lowered into place on the upper exposed surfaces of the group of sheets and these surfaces are simultaneously ground or polished in one continuous operation.

The invention will be more clearly understood from the following detailed description of one approved form of the apparatus.

Figure 1:
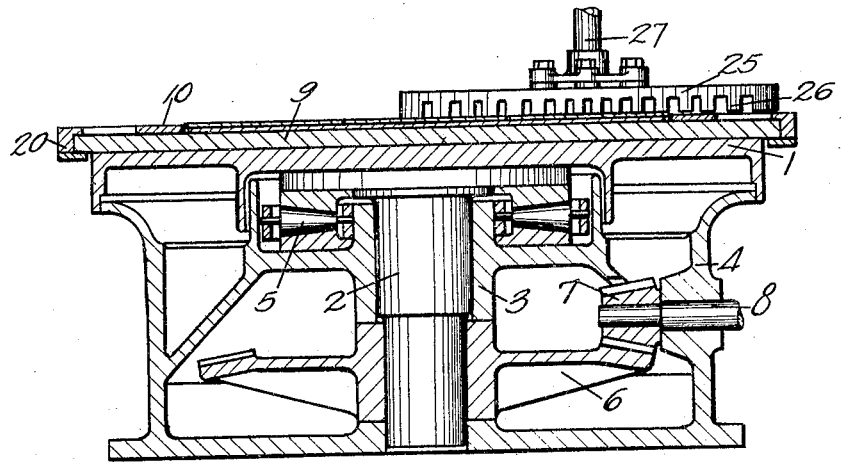
Fig. 1 is a central vertical section through a portion of one of the grinding units, this view being taken substantially on the line 1—1 of Fig. 2.

The sheet-supporting table 1 is mounted at the upper end of a column 2 which turns in bearings 3 in the frame-work 4. The table is preferably supported on roller bearings 5 and is positively rotated by means of a large bevel gear 6, secured to column 2 and driven through bevel pinion 7 on a driveshaft 8, rotated from any suitable source of power such as an electric motor. The table top 9 is round, but is adapted to carry upon its upper face a group of sheets which when assembled have an aggregate area approximately equalling that of the largest square that may be inscribed within the circumference of the table top. This table top 9 is constructed of heavy metal so as to be absolutely rigid, and its upper face is ground as closely as possible to an absolute plane so as to serve as a "master" surface or pattern for the glass sheets which are supported thereon.

Four metal plates 10 are movably mounted on the upper surface of table top 9, so that their inner edges 11 substantially outline a shallow square recess whose bottom is formed by the sheet-supporting surface of the table. Each plate 10 is pivoted at one end to the top of the table by pivot pin 12, its other end 13 being adapted to swing toward or from the center of the table. Only a very slight range of swinging movement is desired and the plate is guided during this movement by a series of pins or screws 14 which project through slots 15 in the plate into the table top 9. Secured to the inner sheet-engaging edge of each plate 10 is a strip 16 of rubber or other suitable yielding material.

Figure 3:
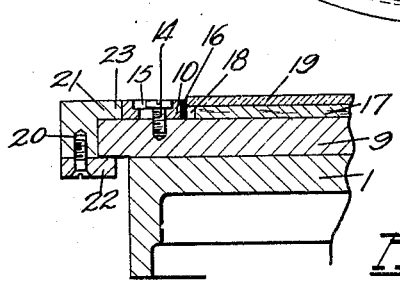
Fig. 3 is a vertical section through a portion of the table edge on an enlarged scale, the view being taken substantially on the line 3—3 of Fig. 2.

A sheet-supporting pad 17 of yielding material covers the upper face of table top 9 within the recess outlined by the clamping plates 10. Material best adapted for this purpose is cork or cork composition. This pad should be of absolutely even thickness, so that the master surface of the table top will be repeated on the upper surface of the cork pad. This pad is of slightly less surface area than the space between the clamping plates so as to allow clearance as shown at 18, Fig. 3, for the movement of the plates 10 toward or from the edges of the glass sheets 19. The aggregate thickness of the cork pad 17 and the glass sheets 19 to be surfaced on this apparatus will be greater than the thickness of the clamping plates 10, so that the surfacing tool, hereinafter described, will not come into contact with the upper faces of the clamping plate.

A continuous ring 20 having an upper flange 21 and a lower flange 22 engaging the edge portions of the upper and lower surfaces of the table top, is slidably mounted around the peripheral edge of the table. A series of four similar cam members 23 are formed at intervals of 90° along the inner edge of flange 21. Each cam 23 is adapted to bear against a cam surface 24 on the outer edge of free end 13 of one of the clamping plates 10.

The grinding head 25 is of a standard design, its lower face comprising a series of teeth or projections 26 which perform the grinding operation on the sheets. While sheets are being placed in or removed from the machine this grinding head is elevated above the table, but when in operation the weight of the grinding head rests upon and is entirely supported by the glass sheets 19. Preferably the pivot 27 for the grinding tool turns freely in suitable bearings so that the head 25 is merely an idler and is rotated by the glass sheet. It will be noted that the axis of rotation of the grinding head is eccentric to the axis of the rotating table, and the head is of such diameter that the operating face will work upon the corners of the group of sheets as well as the center thereof.

Figure 2:
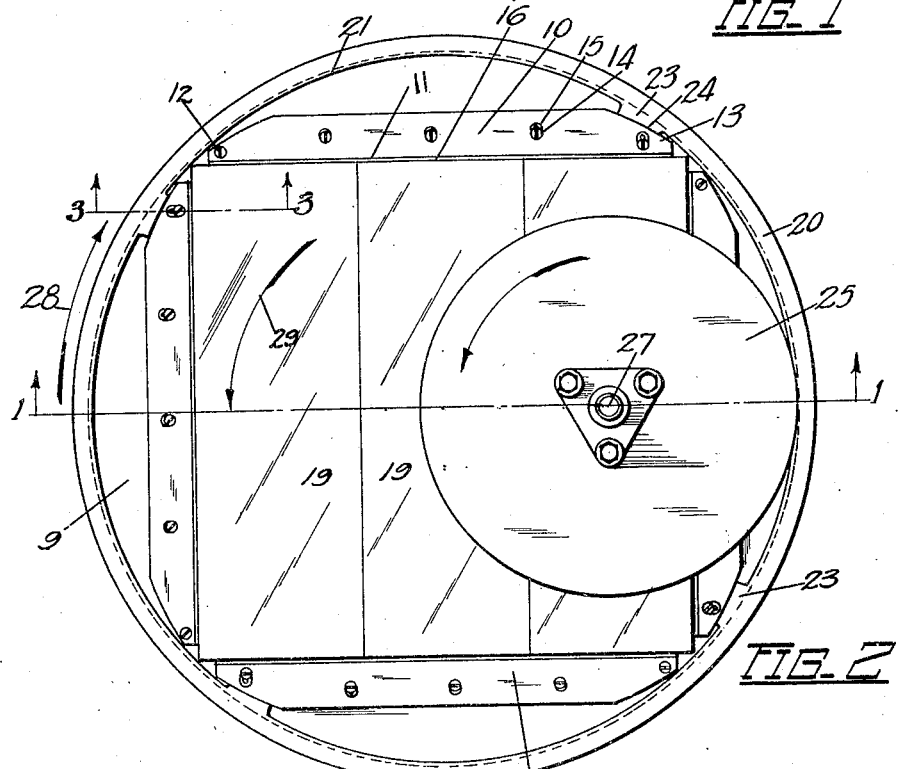
Fig. 2 is a plan view of the sheet-supporting table.

When the machine is stationary and the grinding head 25 is raised, a plurality of glass plates 19 will be laid loosely upon the cork pad 17, as shown in Fig. 2. As here shown, three long and comparatively narrow plates 19 are simultaneously ground, the group of sheets when assembled having a substantially square outline. It is to be understood that this group of sheets is shown merely by way of example and that any other number, or grouping of sheets or plates might be used, it only being essential that the aggregate area and configuration conform substantially to the recess outlined by the clamping plates. When these plates have been placed in position with their inner edges in contact with one another, the operator grasps the ring 20 and shifts it in the direction of arrow 28. This operation slides the cams 23 along cam surfaces 24 and moves the free ends 13 of clamps 10 inwardly against the assembled group of glass sheets. No great pressure is required against the sheets, it merely being essential that the sheets be held firmly against relative movement along their engaging edge portions. The grinding tool 25 is now lowered onto the sheets and the table 1 is rotated in the direction of arrow 29. This direction of movement of the table will tend to lock the sheets more firmly in place against the edges of the assembled sheets.

When one side of the sheets has been surfaced, the rotation of the table is stopped, the grinding head 25 is raised, and the operator will shift the ring 20 in the direction opposite the arrow 28, or counterclockwise as seen in Fig. 2, thus unlocking the clamping plates 10. The glass sheets may now be removed and turned over, or new ones placed upon the table top.

While an apparatus for grinding the glass sheets has here been illustrated and described, it is to be understood that the sheet-supporting table for a polishing machine could be constructed on much the same principle.

According to this invention a plurality of sheets, of the smaller commercial sizes, may be simultaneously surfaced, quickly and efficiently, with a large saving of time and expense as compared with the old method of separately securing the individual sheets in place upon the supporting surface of the table by embedding each sheet in plaster of Paris.

I claim:

1. In an apparatus for surfacing sheet glass, a round sheet-supporting table having a flat upper sheet-supporting surface, a plurality of clamping members movably mounted on the table top adjacent the edges of the sheet-supporting surface, a ring slidably mounted on the peripheral edge of the table, and a series of cams carried by the ring and bearing against the outer edges of the clamping members.

2. In an apparatus for surfacing sheet glass, a round sheet-supporting table having a flat upper sheet-supporting surface, a plurality of clamping members grouped around the supporting surface, each member pivoted at one end to the table-top, a ring slidably mounted on the peripheral edge of the table, and a series of cams carried by the ring and bearing against the outer free ends of the clamping members.

3. In an apparatus for surfacing sheet glass, a table having a flat upper sheet-supporting surface, a plurality of clamping members movably mounted on the table-top adjacent to and defining the edges of the sheet-supporting surface, a cam member behind each clamping member, and means for simultaneously moving the cams to shift the clamping members into engagement with the glass sheets on the supporting surface.

4. In an apparatus for surfacing sheet glass, a sheet supporting table having a sheet-supporting surface, a plurality of clamping members arranged on said supporting surface, and each pivoted thereto, a member slidably mounted peripherally of said table and a plurality of cams carried by said member and engaging the free ends of said clamping members.

Signed at Toledo, in the county of Lucas and State of Ohio, this 1st day of May, 1924.

JOSEPH P. CROWLEY.